US012774171B2

(12) United States Patent
Russ

(10) Patent No.: US 12,774,171 B2
(45) Date of Patent: Oct. 27, 2026

(54) SENSING SYSTEM FOR A CONVEYOR AND A METHOD THEREOF

(71) Applicant: Intelligrated Headquarters, LLC, Mason, OH (US)

(72) Inventor: Benjamin Russ, Cincinnati, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 135 days.

(21) Appl. No.: 18/958,579

(22) Filed: Nov. 25, 2024

(65) Prior Publication Data

US 2026/0145883 A1 May 28, 2026

(51) Int. Cl.
*B65G 3/02* (2006.01)
*B65G 17/06* (2006.01)
*B65G 43/02* (2006.01)

(52) U.S. Cl.
CPC ...... *B65G 43/02* (2013.01); *B65G 2203/0266* (2013.01); *B65G 2203/044* (2013.01)

(58) Field of Classification Search
None
See application file for complete search history.

(56) References Cited

U.S. PATENT DOCUMENTS 5,563,392 A * 10/1996 Brown ................ G01B 11/043 324/206
6,993,978 B2 2/2006 Frost
7,117,989 B2 10/2006 Weigel et al.
8,285,494 B2 10/2012 Vozner
8,636,140 B2 1/2014 Tout et al.
11,524,848 B2 * 12/2022 Kreisfeld .............. G01B 21/32
11,655,126 B2 * 5/2023 Hirai ...................... B65G 23/44 198/502.1
2014/0124336 A1 * 5/2014 Domenicucci ........... A21B 3/00 198/810.02

(Continued)

FOREIGN PATENT DOCUMENTS

DE 102018119466 A1 * 2/2020 ............. G01B 7/026
EP 3196625 A1 * 7/2017 .......... G01M 13/023
JP 7263498 B1 * 4/2023

OTHER PUBLICATIONS

Extended European Search Report Mailed on Mar. 31, 2026 for EP Application No. 25209979, 7 page(s).

*Primary Examiner* — Gene O Crawford
*Assistant Examiner* — Muhammad Awais
(74) *Attorney, Agent, or Firm* — Alston & Bird LLP

(57) ABSTRACT

A sensing system for a conveyor having at least a first chain for propelling the conveyor is disclosed. The sensing system comprises at least a first sensor to detect each of a first plurality of chain links moving past the first sensor. The sensing system further comprises at least one processor configured to determine a count of the first plurality of chain links detected by the first sensor; determine a first elapsed time for the count of the first plurality of chain links to reach a predetermined target count; determine whether the first elapsed time for the count of the first plurality of chain links to reach the predetermined target count exceeds a first threshold time; and generate a first alarm signal if the first elapsed time for the count of the first plurality of chain links to reach the predetermined target count exceeds the first threshold time.

20 Claims, 7 Drawing Sheets

(56) References Cited

U.S. PATENT DOCUMENTS

| | | | | |
|---|---|---|---|---|
| 2016/0010977 | A1* | 1/2016 | Frost | B65G 43/02 702/34 |
| 2017/0030815 | A1* | 2/2017 | Frost | G01N 3/56 |
| 2017/0225901 | A1* | 8/2017 | Brown | B65G 43/02 |
| 2019/0062067 | A1* | 2/2019 | Kreisfeld | G01B 11/043 |
| 2019/0368862 | A1* | 12/2019 | Murray | B65G 15/30 |
| 2020/0130946 | A1* | 4/2020 | Morey | B65G 23/14 |
| 2023/0175829 | A1* | 6/2023 | Krank | B65G 17/00 198/502.1 |

* cited by examiner

SENSING SYSTEM FOR A CONVEYOR AND A METHOD THEREOF

TECHNOLOGICAL FIELD

Example embodiments of the present disclosure generally relates to a sensing system, and more particularly relates to a sensing system for a conveyor having at least a chain for propelling the conveyor.

BACKGROUND

Chain-driven conveyor system used in sorter conveyors rely on long chains to transmit mechanical power for transporting materials across a conveyor system. The long chains are composed of pins, links, and rollers, all of which are subject to wear over time. The wear and tear of the pins, links, and rollers occur through two primary mechanisms. One is in-line pulling force and other is rotational friction. While the in-line pulling force is effectively managed by existing technologies, the wear caused by the rotational friction at each chain link is more problematic. The frictional wear of the chain link not only degrades the chain itself but can also damage the conveyor system, ultimately leading to the conveyor system failure. As the chain wears, the chain elongation disrupts the conveyor system's functionality, impacting efficiency and requiring maintenance interventions. To counteract the chain wear, the conveyor system relies on periodic lubrication to reduce friction and maintain smooth operation. In the sorter conveyor, ultrasonic sensors are employed to monitor the chain conditions. However, the ultrasonic sensors have proven to be unreliable and inaccurate in detecting the subtle wear and elongation that occur over time.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a sensing system for a conveyor has at least a first chain for propelling the conveyor is disclosed. The first chain comprises a first plurality of chain links. The sensing system comprises at least a first sensor positioned to detect each of the first plurality of chain links moving past the first sensor as the first chain moves to propel the conveyor. The sensing system further comprises at least one processor. The at least one processor is configured to determine a count of the first plurality of chain links detected by the first sensor. The at least one processor is further configured to determine a first elapsed time for the count of the first plurality of chain links to reach a predetermined target count. The at least one processor is further configured to determine whether the first elapsed time for the count of the first plurality of chain links to reach the predetermined target count exceeds a first threshold time. Thereafter, the at least one processor is configured to generate a first alarm signal if the first elapsed time for the count of the first plurality of chain links to reach the predetermined target count exceeds the first threshold time.

In some embodiments, the conveyor has a second chain for propelling the conveyor. The second chain comprises a second plurality of chain links. The sensing system further comprises a second sensor positioned to detect each of the second plurality of chain links moving past the second sensor as the second chain moves to propel the conveyor. The sensing system further comprises the at least one processor. The at least one processor is configured to determine a count of the second plurality of chain links detected by the second sensor. The at least one processor is further configured to determine a second elapsed time for the count of the second plurality of chain links to reach the predetermined target count. Further, the at least one processor is further configured to determine whether the second elapsed time for the count of the second plurality of chain links to reach the predetermined target count exceeds a second threshold time. Thereafter, the at least one processor is configured to generate a second alarm signal if the second elapsed time for the count of the second plurality of chain links to reach the predetermined target count exceeds the second threshold time.

In some embodiments, the at least one processor is configured to determine a difference between the first elapsed time and the second elapsed time. Further, the at least one processor is further configured to determine if the difference between the first elapsed time and the second elapsed time exceeds a third threshold time. Further, the at least one processor is further configured to generate a third alarm signal if the difference between the first elapsed time and the second elapsed time exceeds the third threshold time.

In some embodiments, the sensing system further comprises a first counter unit communicatively coupled to the first sensor to detect a signal generated by the first sensor in response to each of the first plurality of chain links moving past the first sensor. The sensing system further comprises a first register communicatively coupled to the first counter unit to increment when each signal from the first sensor is detected. The sensing system further comprises a second counter unit communicatively coupled to the second sensor to detect a signal generated by the second sensor in response to each of the second plurality of chain links moving past the second sensor. Further, the sensing system comprises a second register communicatively coupled to second counter unit to increment when each signal from the second sensor is detected. The first register is communicatively coupled to the at least one processor. The second register is communicatively coupled to the at least one processor. The first register has a first overflow value. The second register has a second overflow value equal to the first overflow value of the first register. The predetermined target count equals the first overflow value of the first register.

In some embodiments, the at least one processor determines the first elapsed time for the count of the first plurality of chain links to reach the predetermined target count when the at least one processor receives an overflow signal from the first register. The at least one processor determines the second elapsed time for the count of the second plurality of chain links to reach the predetermined target count when the at least one processor receives an overflow signal from the second register.

In some embodiments, the sensing system comprises an alarm unit communicatively coupled to the at least one processor.

In some embodiments, wherein the alarm unit is configured to trigger an alarm based at least on the generated first alarm signal, the generated second alarm signal, and/or the generated third alarm signal. The triggered alarm based on the first alarm signal indicates an elongation of the first chain. The triggered alarm based on the second alarm signal indicates an elongation of the second chain. The triggered alarm based on the third alarm signal indicates a delta exists between an elongation of the first chain and an elongation of the second chain.

In some embodiments, the first threshold time corresponds to an elapsed time for the count of the first plurality of chain links to reach the predetermined target count during a calibration test of the sensing system. The second threshold time corresponds to an elapsed time for the count of the second plurality of chain links to reach the predetermined target count during the calibration test of the sensing system.

In some embodiments, the first sensor and the second sensor correspond to an optical sensor.

In some embodiments, the first plurality of chain links and the second plurality of chain links correspond to at least one of shoe sorter pins, shoe sorter rollers, connecting pins, attachment links, or guide links.

In another example embodiment, a method is disclosed. The method comprising steps of detecting, via a first sensor, each of a first plurality of chain links moving past the first sensor as a first chain moves to propel a conveyor. The method further comprises steps of determining, via at least one processor, a count of the plurality of chain links detected by the first sensor. The method further comprises steps of determining, via the at least one processor, a first elapsed time for the count of the first plurality of chain links to reach a predetermined target count. Further, the method comprises steps of determining, via the at least one processor, whether the first elapsed time for the count of the first plurality of chain links to reach the predetermined target count exceeds a first threshold time. Thereafter, the method comprises steps of generating, via the at least one processor, a first alarm signal if the first elapsed time for the count of the first plurality of chain links to reach the predetermined target count exceeds the first threshold time.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
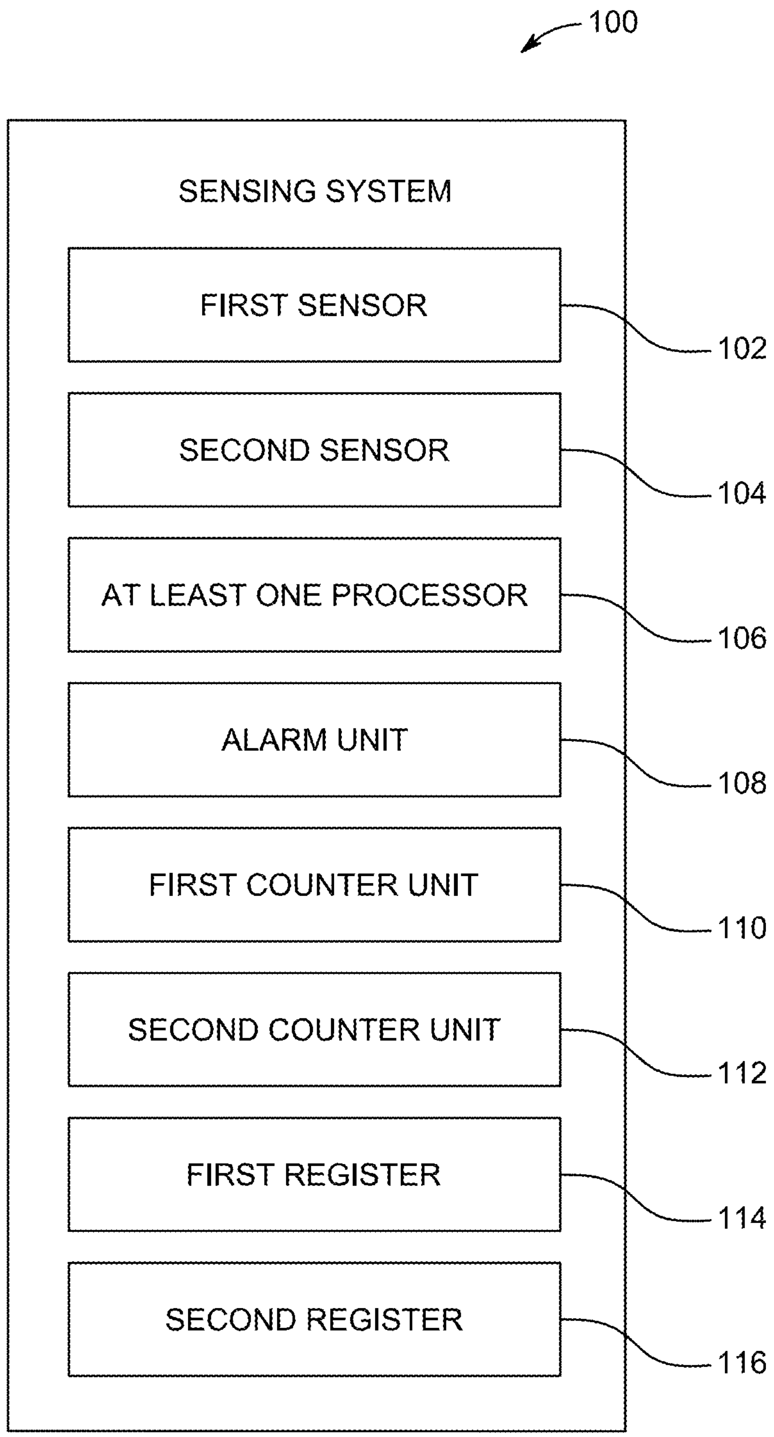
Figure 2A:
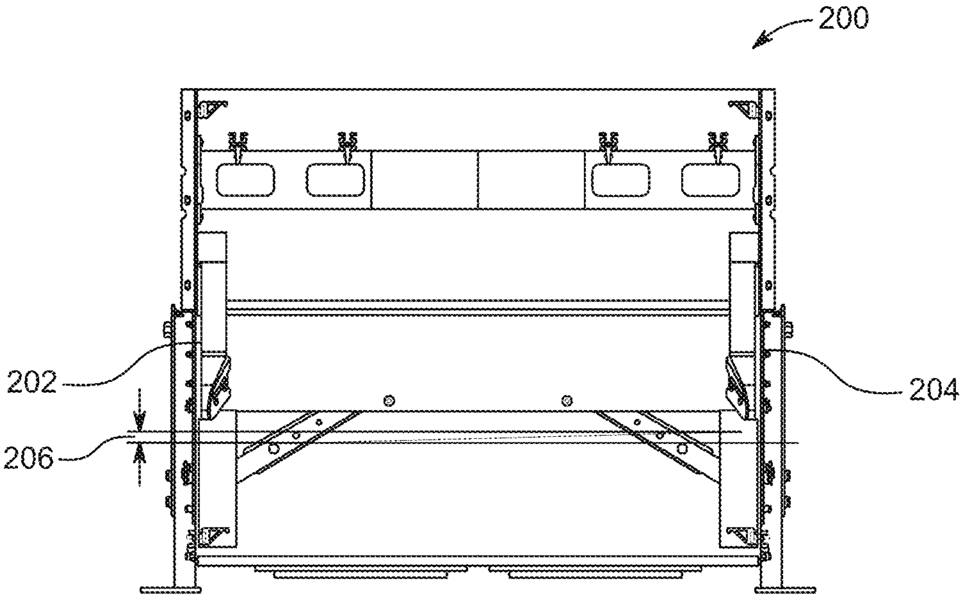
Figure 2B:
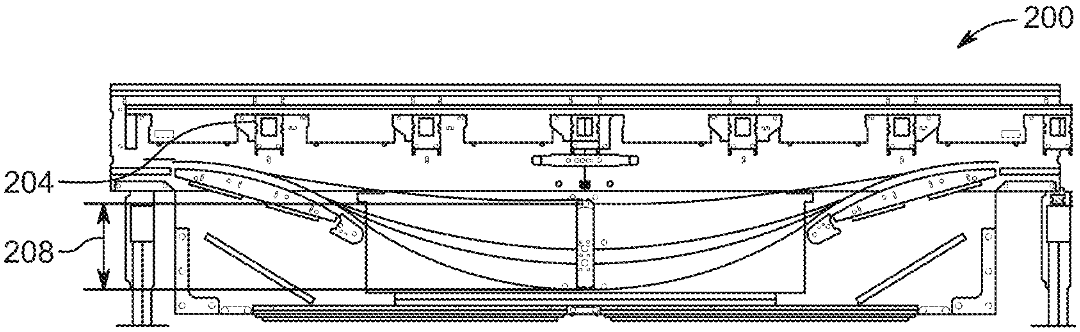
Figure 3:
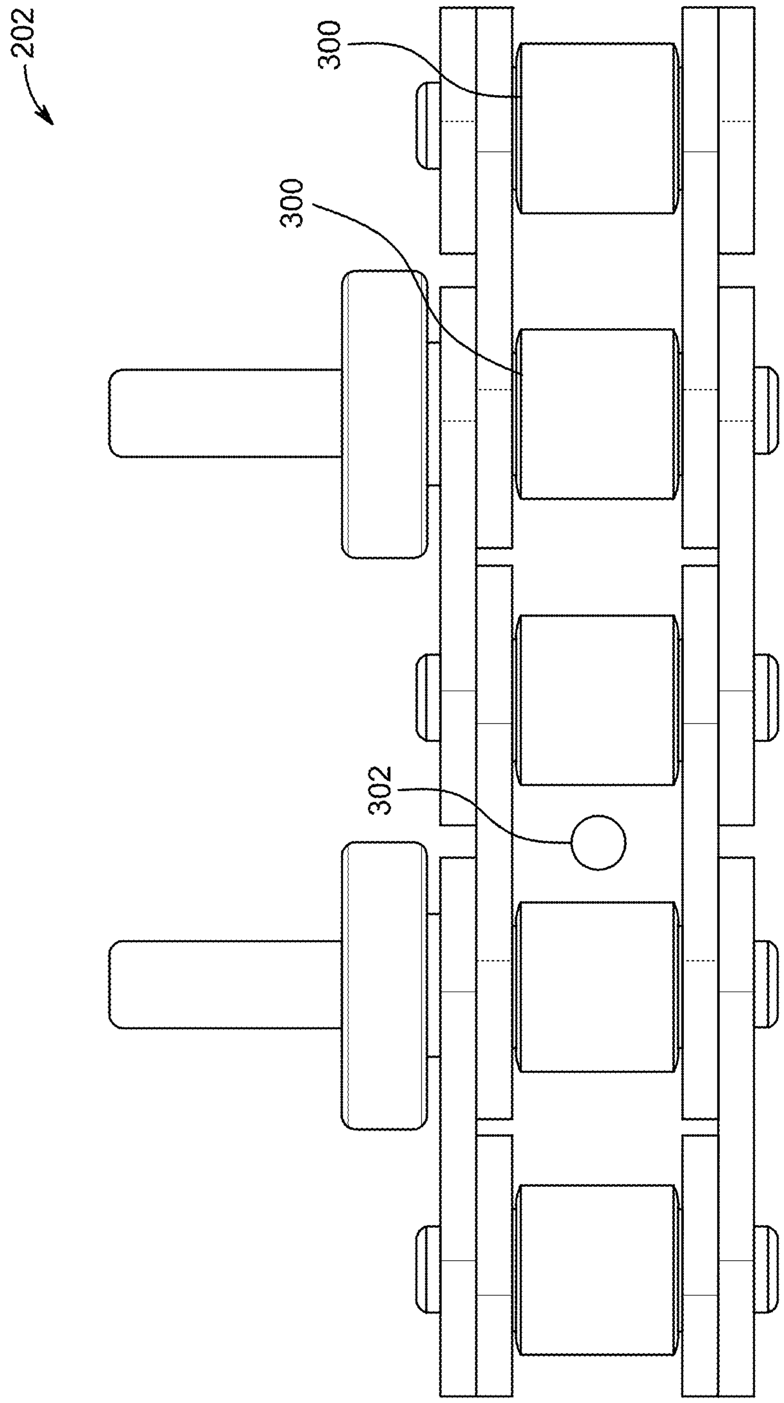
Figure 4:
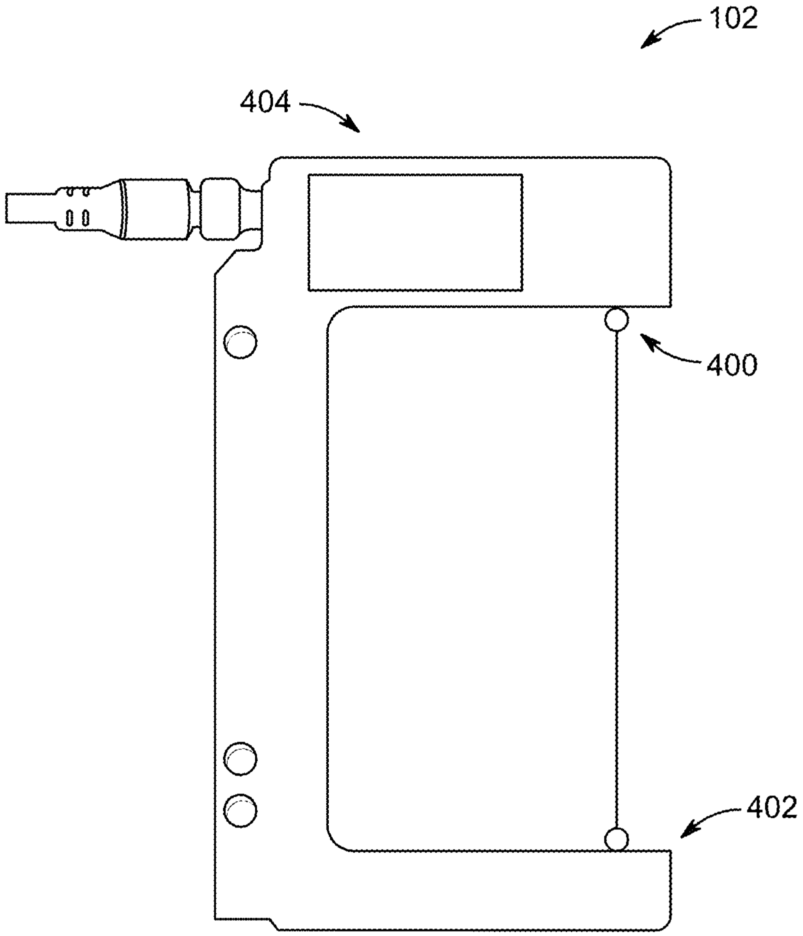
Figure 5:
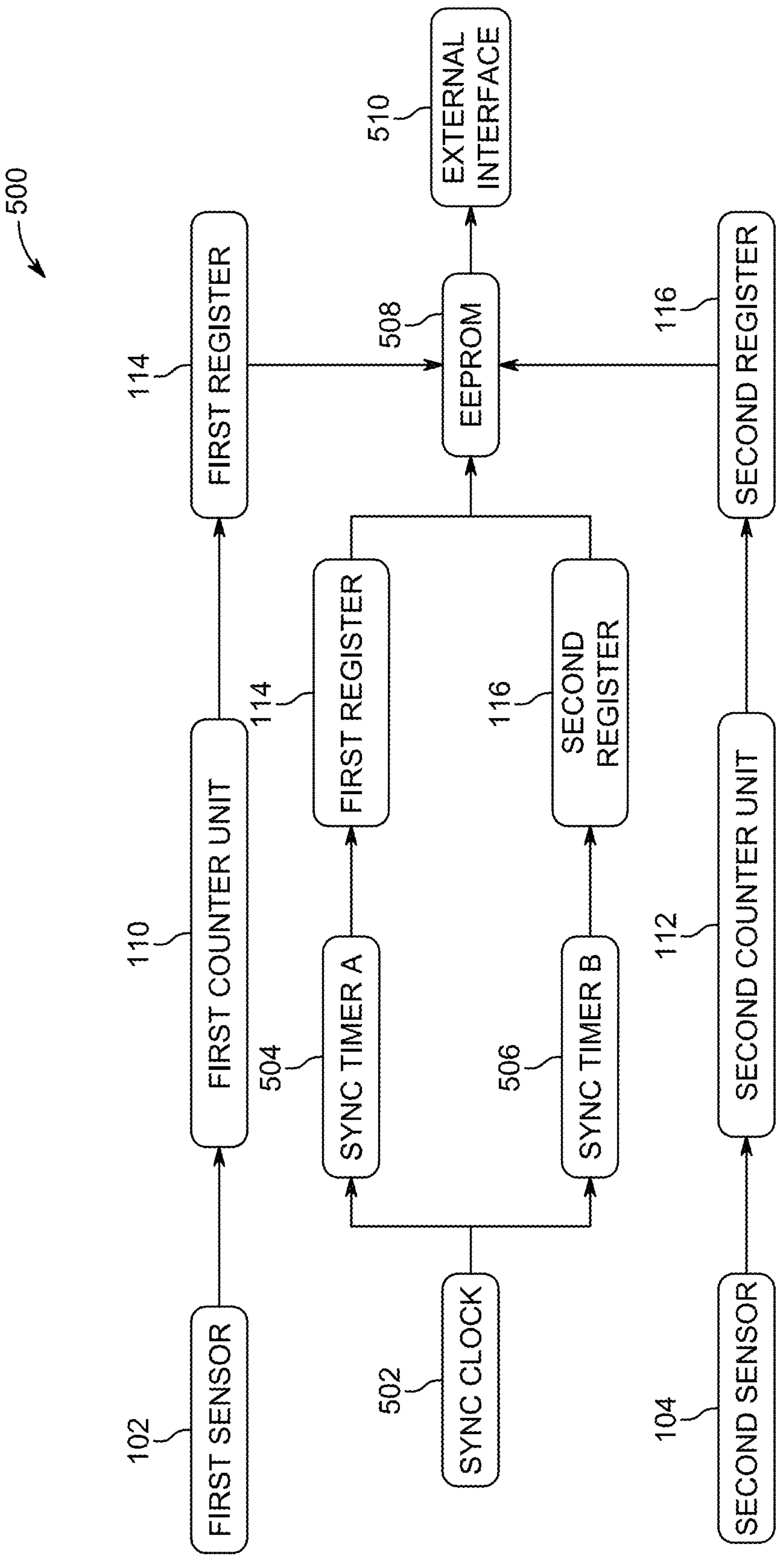
Figure 6:
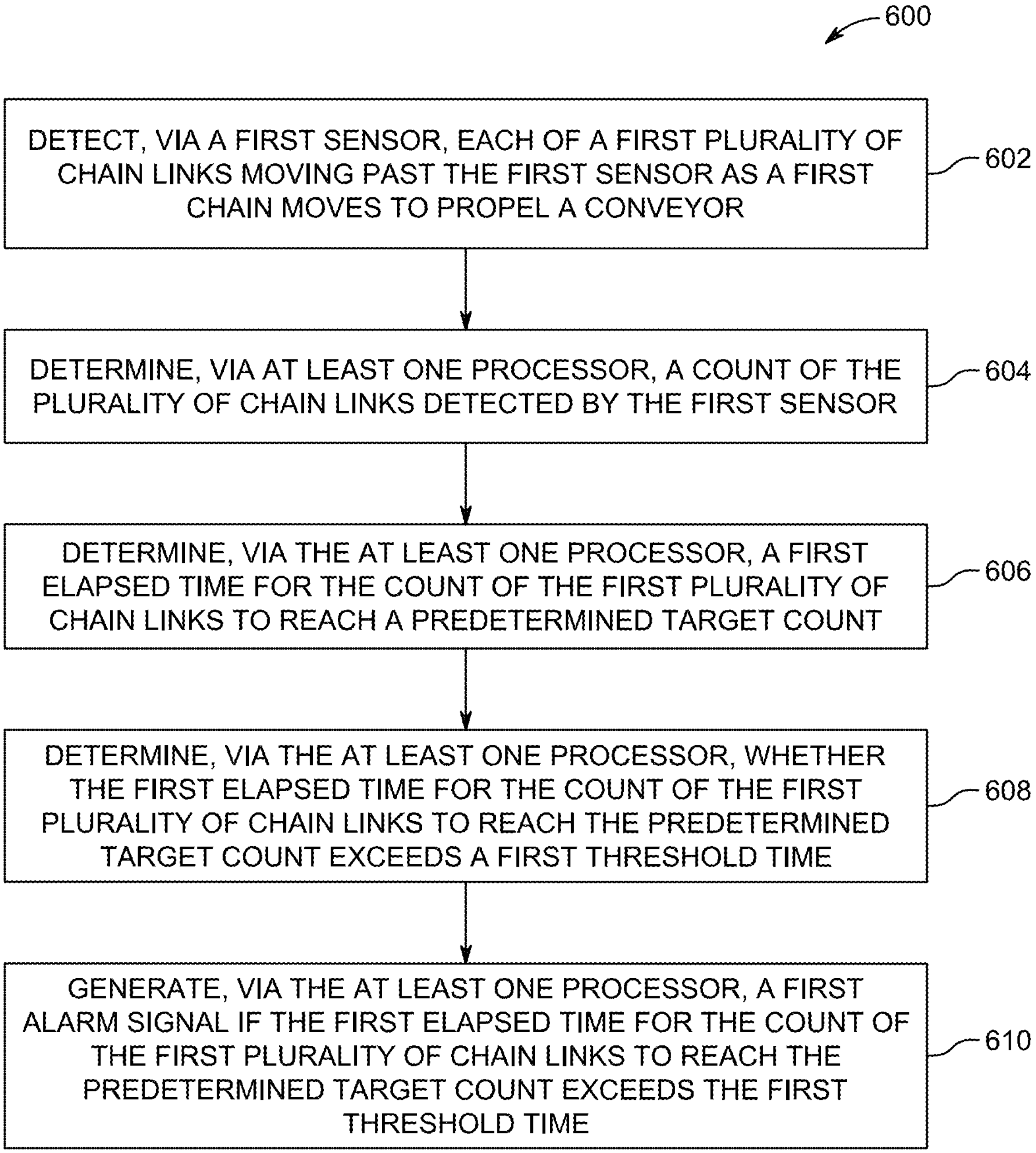
Figure 7:
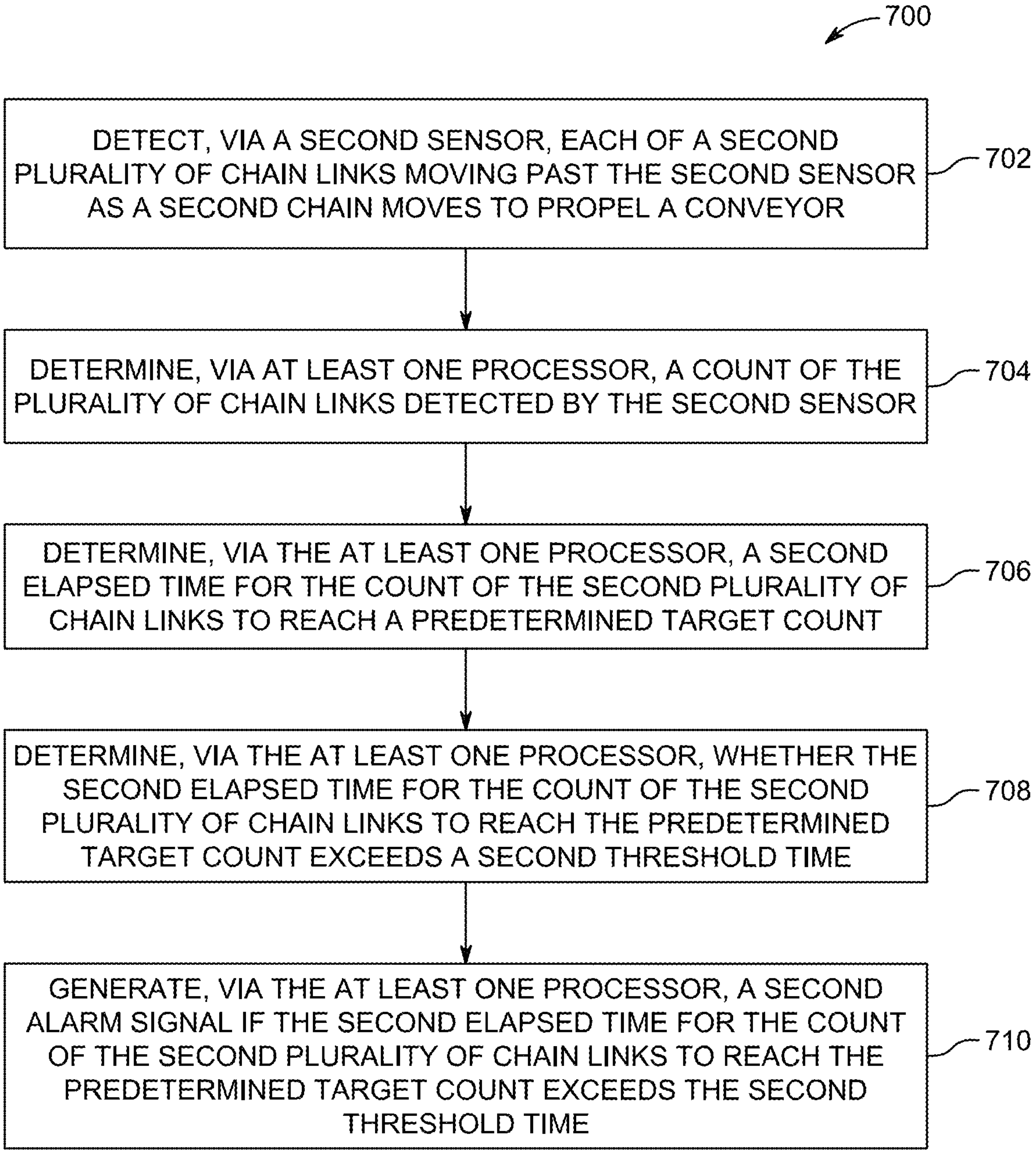

Having thus described certain example embodiments of the present disclosure in general terms, reference will hereinafter be made to the accompanying drawings, which are not necessarily drawn to scale, and wherein:

FIG. 1 illustrates a block diagram of a sensing system for a conveyor in accordance with an example embodiment of the present disclosure;

FIG. 2A illustrates a front view of a conveyor having a first chain comprising a first plurality of chain links in accordance with an example embodiment of the present disclosure;

FIG. 2B illustrates a side view of the conveyor in accordance with an example embodiment of the present disclosure;

FIG. 3 illustrates a top view of the first chain having the first plurality of chain links in accordance with an example embodiment of the present disclosure;

FIG. 4 illustrates a perspective view of a first sensor in accordance with an example embodiment of the present disclosure;

FIG. 5 illustrates a flowchart showing a signal processing method for the first chain and a second chain wear detection in accordance with an example embodiment of the present disclosure;

FIG. 6 illustrates a flowchart showing method for detecting wear in the first chain in accordance with an example embodiment of the present disclosure; and FIG. 7 illustrates a flowchart showing a method for detecting wear in the second chain in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

As used herein, the term “comprising” means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases “in various embodiments,” “in one embodiment,” “according to one embodiment,” “in some embodiments,” and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word “example” or “exemplary” is used herein to mean “serving as an example, instance, or illustration.” Any implementation described herein as “exemplary” is not necessarily to be construed as preferred or advantageous over other implementations.

If the specification states a component or feature “may,” “can,” “could,” “should,” “would,” “preferably,” “possibly,” “typically,” “optionally,” “for example,” “often,” or “might” (or other such language) be included or have a characteristic, that a specific component or feature is not required to be included or to have the characteristic. Such a component or feature may be optionally included in some embodiments or it may be excluded.

The present disclosure provides various embodiments of a sensing system. Embodiments may be configured to detect each of a first plurality of chain links moving past a first sensor as a first chain moves to propel a conveyor. Embodiments may be configured to determine a count of the first plurality of chain links detected by the first sensor. Embodiments may be configured to determine a first elapsed time for the count of the first plurality of chain links to reach a predetermined target count. Embodiments may be configured to determine whether the first elapsed time for the count of the first plurality of chain links to reach the predetermined target count exceeds a first threshold time. Embodiments may be further configured to generate a first alarm signal if the first elapsed time for the count of the first plurality of chain links to reach the predetermined target count exceeds the first threshold time.

Embodiments may be configured to detect each of a second plurality of chain links moving past a second sensor as a second chain moves to propel the conveyor. Embodiments may be configured to determine a count of the second plurality of chain links detected by the second sensor. Embodiments may be further configured to determine a second elapsed time for the count of the second plurality of chain links to reach the predetermined target count. Embodiments may be configured to determine whether the second elapsed time for the count of the second plurality of chain links to reach the predetermined target count exceeds a second threshold time. Embodiments may be further configured to generate a second alarm signal if the second elapsed time for the count of the second plurality of chain links to reach the predetermined target count exceeds the second threshold time.

Embodiments may be configured to determine a difference between the first elapsed time and the second elapsed time. Embodiments may be configured to determine if the difference between the first elapsed time and the second elapsed time exceeds a third threshold time. Embodiments may be configured to generate a third alarm signal if the difference between the first elapsed time and the second elapsed time exceeds the third threshold time. Embodiments may be configured to detect a signal generated by the first sensor. Embodiments may be configured to detect a signal generated by the second sensor. Embodiments may be configured to trigger an alarm based at least on a generated first alarm signal, a generated second alarm signal, and/or a generated third alarm signal.

FIG. 1 illustrates a block diagram of a sensing system 100 for a conveyor 200, in accordance with an example embodiment of the present disclosure. FIG. 2A illustrates a front view of the conveyor 200 having a first chain 202 comprising a first plurality of chain links 300, in accordance with an example embodiment of the present disclosure. FIG. 2B illustrates a side view of the conveyor 200, in accordance with an example embodiment of the present disclosure. FIG. 3 illustrates a top view of the first chain 202 having the first plurality of chain links 300, in accordance with an example embodiment of the present disclosure.

In some embodiments, the conveyor 200 may be a mechanical device configured to move one or more products from one position to another position. The conveyor 200 may be used in industrial, commercial, manufacturing, logistics, distribution, and retail settings for transporting the one or more products. The one or more products may include, but is not limited to, boxes, packages, components, and raw materials. The conveyor 200 may be automated and may save time and reduce manual labor.

In some embodiments, the conveyor 200 may transport the one or more products over short to long distances. The conveyor 200 may include, but is not limited to, a belt conveyor, a roller conveyor, and a chain conveyor. The conveyor 200 may be used in a warehouse. In some embodiments, a sorter conveyor may correspond to a conveyor 200 configured to sort the one or more products. The one or more products may be sort based at least on size, weight, or dimension of the one or more products.

In some embodiments, the conveyor 200 may correspond to a chain-driven conveyor. The conveyor 200 may comprise the sensing system 100. The sensing system 100 may comprise a first sensor 102, a second sensor 104, at least one processor 106, and an alarm unit 108. The sensing system 100 may be configured to maintain correct tension in the first chain 202 and a second chain 204. The sensing system 100 may be configured to ensure that the first chain 202 and the second chain 204 may remain tight to prevent slippage over the conveyor 200.

In some embodiments, the conveyor 200 may have at least the first chain 202 and the second chain 204 for propelling the conveyor 200. The sensing system 100 may be configured to ensure that the first chain 202 and the second chain 204 may remain tight to prevent misalignment or derailment over the conveyor 200. The sensing system 100 may be further configured to ensure that the first chain 202 and the second chain 204 may not be too tight.

In some embodiments, the first chain 202 and the second chain 204 may require periodic checks by a user. The user may correspond to an operator. If the first chain 202 becomes too loose, then the first chain 202 may slip. Similarly, if the second chain 204 becomes too loose, then the second chain 204 may slip. Further, over-tensioning may cause stress on the first chain 202 and/or the second chain 204 and may lead to wear of the first chain 202 and/or the second chain 204. Further, the sensing system 100 may adjust the tension without human intervention.

In some embodiments, at least the first sensor 102 may be positioned to detect each of the first plurality of chain links 300 (as shown in FIG. 3) moving past the first sensor 102 as the first chain 202 moves to propel the conveyor 200. The first plurality of chain links 300 may correspond to a plurality of links that may make up the first chain 202. As the first chain 202 moves, the first sensor 102 may be configured to detect each of the first plurality of chain links 300 as the first plurality of chain links 300 pass by the first sensor 102. The first sensor 102 and the second sensor 104 may correspond to an optical fork sensor, an ultrasonic sensor, or a hall effect sensor, or any other suitable sensor.

In some embodiments, the first sensor 102 and the second sensor 104 may be positioned on each side of the conveyor 200. The first sensor 102 and the second sensor 104 may be configured to count a movement of, respectively, the first plurality of chain links 300 and the second plurality of chain links. The first sensor 102 and/or the second sensor 104 may be configured to detect the movement of the first plurality of chain links 300 and/or the second plurality of chain links as the first plurality of chain links 300 and/or the second plurality of chain links pass through the first sensor 102 and/or the second sensor 104. The first plurality of chain links 300 and the second plurality of chain links may correspond to at least one of shoe sorter pins, shoe sorter rollers, connecting pins, attachment links, and/or guide links.

In some embodiments, the first sensor 102 and the second sensor 104 may correspond to a photoelectric sensor that may operate using a plurality of light beams to detect a presence and the movement of the first plurality of chain links 300 and/or the second plurality of chain links. The first sensor 102 may be configured to track a passage of the first plurality of chain links 300 as the first plurality of chain links 300 passes through the first sensor 102. Similarly, the second sensor 104 may be configured to track a passage of second plurality of chain links as the second plurality of chain links passes through the second sensor 104.

In some embodiments, the sensing system 100 further comprises the at least one processor 106. The at least one processor 106 may correspond to a controller. In some embodiments, the at least one processor 106 may be configured to determine a count of the first plurality of chain links 300 detected by the first sensor 102. The at least one processor 106 may track and monitor a movement of the first plurality of chain links 300 in the conveyor 200. As the first chain 202 moves along a path on the conveyor 200, each of the first plurality of chain links 300 may pass through the first sensor 102. The first sensor 102 may be configured to detect each of the first plurality of chain links 300 as the first plurality of chain links 300 may enter a detection region 302 (as shown in FIG. 3) and may generate a signal for each of the first plurality of chain links 300 detected.

In some embodiments, when each of the first plurality of chain links 300 is detected, the generated signal may be sent to the at least one processor 106. The generated signal may correspond to the count of the first plurality of chain links 300 detected by the first sensor 102. In some embodiments, based at least on the generated signal, the at least one processor 106 may determine the count of the first plurality of chain links 300 passing through the first sensor 102.

In some embodiments, the at least one processor 106 may be configured to determine a first elapsed time for the count of the first plurality of chain links 300 to reach a predetermined target count. The first elapsed time may correspond to an amount of time taken by the first plurality of chain links 300 to pass through the first sensor 102. In one embodiments, the predetermined target count may correspond to the total number of the first plurality of chain links 300 present in the first chain 202. In another embodiment, the predetermined target count may correspond to a predetermined number of the first plurality of chain links 300.

In some embodiments, the at least one processor 106 may be further configured to determine whether the first elapsed time for the count of the first plurality of chain links 300 to reach the predetermined target count may exceed a first threshold time. The at least one processor 106 may be configured to compare the first elapsed time and the first threshold time. The first threshold time may correspond to a predefined acceptable time limit. The first threshold time may correspond to a maximum time taken by the first plurality of chain links 300 to pass through the first sensor 102. In some embodiments, once the predetermined target count may have been reached, the at least one processor 106 may compare the measured first elapsed time to the first threshold time.

In some embodiments, the at least one processor 106 may determine whether the first elapsed time may be greater than the first threshold time. If the first elapsed time exceeds the first threshold time, then the sensing system 100 may indicate that the first chain 202 may be moving slower than expected. The first elapsed time may exceed the first threshold time due to chain elongation, or mechanical issues. In some embodiments, the at least one processor 106 may be configured to generate a first alarm signal if the first elapsed time for the count of the first plurality of chain links 300 to reach the predetermined target count exceeds the first threshold time. The first alarm signal may alert the user that the first chain 202 may be underperforming or the first chain 202 may be experiencing chain elongation. The first alarm signal may trigger an audible or a visual alert.

In some embodiments, the second sensor 104 may be positioned to detect each of the second plurality of chain links moving past the second sensor 104 as the second chain 204 may move to propel the conveyor 200. In some embodiments, the at least one processor 106 may be further configured to determine a count of the second plurality of chain links detected by the second sensor 104. The at least one processor 106 may track and monitor a movement of the second plurality of chain links in the conveyor 200. As the second chain 204 moves along a path on the conveyor 200, each of the second plurality of chain links may pass through the second sensor 104. The second sensor 104 may be configured to detect each of the second plurality of chain links as the second plurality of chain links may enter the detection region 302 and may generate a signal for each of the second plurality of chain links detected.

In some embodiments, when each of the second plurality of chain links is detected, the generated signal may be sent to the at least one processor 106. The generated signal may correspond to the count of the second plurality of chain links detected by the second sensor 104. In some embodiments, based at least on the generated signal, the at least one processor 106 may determine the count of the second plurality of chain links passing through the second sensor 104.

In some embodiments, the at least one processor 106 may be configured to determine a second elapsed time for the count of the second plurality of chain links to reach the predetermined target count. The second elapsed time may correspond to an amount of time taken by the second plurality of chain links to pass through the second sensor 104. The predetermined target count may correspond to the total number of the second plurality of chain links present in the second chain 204. The predetermined target count may correspond to a predetermined number of the second plurality of chain links. The predetermined number of the first plurality of chain links 300 and the predetermined number of the second plurality of chain links may be equal.

In some embodiments, the at least one processor 106 may further be configured to determine whether the second elapsed time for the count of the second plurality of chain links to reach the predetermined target count may exceed a second threshold time. The at least one processor 106 may be further configured to compare the second elapsed time and the second threshold time. The second threshold time may correspond to a predefined acceptable time limit. The second threshold time may correspond to a maximum time taken by the second plurality of chain links to pass through the second sensor 104. In one example embodiment, the predetermined target count for the first plurality of chain links 300 and the second plurality of chain links may be different, as the number of the first plurality of chain links 300 may be different from the number of the second plurality of chain links. In another example embodiment, the predetermined target count for the first plurality of chain links 300 and the second plurality of chain links may be same, as the number of the first plurality of chain links 300 may be same as the number of the second plurality of chain links.

In some embodiments, the at least one processor 106 may determine whether the second elapsed time may be greater than the second threshold time. If the second elapsed time exceeds the second threshold time, then the sensing system 100 may indicate that the second chain 204 may be moving slower than expected. The second elapsed time may exceed the second threshold time due to the chain elongation or the mechanical issues.

In some embodiments, the at least one processor 106 may be configured to generate a second alarm signal if the second elapsed time for the count of the second plurality of chain links to reach the predetermined target count exceeds the second threshold time. The second alarm signal may alert the user that the second chain 204 may be underperforming or the second chain 204 may be experiencing the chain elongation. The second alarm signal may trigger the audible or the visual alert. In one example embodiment, the first threshold time and the second threshold time may correspond to two different thresholds. The first chain 202 and the second chain 204 may operate independently. The first chain 202 and the second chain 204 may wear at different wear rates. The wear rates may differ due to variations in one or more factors. The one or more factors may include, but is not limited to, load, environmental conditions, or usage patterns. In one example embodiment, the first threshold time and the second threshold time may be same during an initial calibration. In another example, random chance may align the wear rates of the first chain 202 and the second chain 204 temporarily.

In some embodiments, the at least one processor 106 may be configured to determine a difference between the first elapsed time and the second elapsed time. The difference between the first elapsed time and the second elapsed time may indicate whether the first chain 202 and the second chain 204 of the conveyor 200 are operating at same speed or at different speeds. In some embodiments, the first chain 202 and the second chain 204 may be synchronized and may operate at the same speed.

In some embodiments, the at least one processor 106 may be configured to determine if the difference between the first elapsed time and the second elapsed time may exceed a third threshold time. The third threshold time may correspond to a predefined allowable limit for how much time difference may be acceptable between the first elapsed time and the second elapsed time. The third threshold may be determined during the conveyor 200 setup or the calibration. The at least one processor 106 may be configured to compare the determined difference to the third threshold.

In some embodiments, the at least one processor 106 may be configured to generate a third alarm signal if the difference between the first elapsed time and the second elapsed time may exceed the third threshold time. The third alarm signal may be used to alert the user that a delta exists between an elongation of the first chain 202 and an elongation of the second chain 204.

In some embodiments, the at least one processor 106 may be configured to calculate a difference in how much the first chain 202 and/or the second chain 204 may be stretched. The difference between the first elapsed time and the second elapsed time may correspond to an uneven chain elongation. The uneven chain elongation between each side of the conveyor 200 may cause misalignment of the conveyor 200. The uneven chain elongation between each side of the conveyor 200 may also lead to jamming of the conveyor 200. In one example, if the first chain 202 of the conveyor 200 stretches by 0.75 inches and the second chain 204 of the conveyor 200 stretches by 0.5 inches, then a chain delta (as shown by 206 in FIG. 2A) may be 0.25 inches.

In some embodiments, the sensing system 100 further comprises the alarm unit 108. The alarm unit 108 may be communicatively coupled to the at least one processor 106. The alarm unit 108 may be configured to trigger an alarm based at least on the generated first alarm signal, the generated second alarm signal, and/or the generated third alarm signal. The triggered alarm based on the first alarm signal may indicate an elongation of the first chain 202. The triggered alarm based on the second alarm signal may indicate chain sag of the second chain 204 (as shown by 208 in FIG. 2B). The triggered alarm based on the third alarm signal may indicate a delta may exist between an elongation of the first chain 202 and an elongation of the second chain 204. In one example, the first chain 202 of the conveyor 200 may comprise 100 chain links. If 100 chain links passed through the first sensor 102 in 10 seconds during installation of the conveyor 200, then the first threshold time may correspond to 10 seconds.

In some embodiments, the at least one processor 106 may be configured to compare the first elapsed time and the second elapsed time with the first threshold time and the second threshold time respectively. The at least one processor 106 may check whether the first elapsed time and the second elapsed time may exceed the first threshold time and the second threshold time respectively. If the compared measured times do not exceed the predetermined thresholds, then no lubrication routine may be needed. If the measured first elapsed time and the second elapsed time exceed the first threshold time and the second threshold time respectively, then the first chain 202 and the second chain 204 may be elongated due to wear in the first chain 202 and/or the second chain 204. Elongation of the first chain 202 and/or the second chain 204 may occur when the first plurality of chain links 300 and/or the second plurality of chain links experience wear and tear, causing the first chain 202 and/or the second chain 204 to stretch. The stretching of the first chain 202 and/or the second chain 204 may increase distance between the first plurality of chain links 300 and/or the second plurality of chain links. Increasing the distance between the first plurality of chain links 300 and/or the second plurality of chain links may result in a longer time for the first plurality of chain links 300 and/or the second plurality of chain links to pass through the first sensor 102 and/or the second sensor 104.

In some embodiments, the at least one processor 106 may be configured to determine chain elongation on each side of the conveyor 200 based on the determined elapsed time exceeding a threshold time. The chain elongation may correspond to chain sag (as shown by 208) on each side of the conveyor 200. The chain elongation may correspond to hanging of the first chain 202 and/or the second chain 204 due to an increased length of the first chain 202 and/or the second chain 204. The at least one processor 106 may determine the chain sag on both sides of the conveyor 200. The first chain 202 and/or the second chain 204 may not wear uniformly on both sides of the conveyor 200.

In some embodiments, the at least one processor 106 may be configured to determine a difference in chain elongation between each side of the conveyor 200. The difference in chain elongation between each side of the conveyor 200 may correspond to a chain delta (as shown by 206). The chain wear may not be uniform across both sides of the conveyor 200. In some embodiments, the at least one processor 106 may be further configured to generate a feedback signal corresponding to the triggering of the alarm unit 108. In some embodiments, the at least one processor 106 may be configured to initiate a lubrication routine for the first chain 202 and/or the second chain 204 based at least on the generation of the feedback signal.

In some embodiments, the sensing system 100 further comprises a first counter unit 110, a second counter unit 112, a first register 114, and a second register 116. In some embodiments, the first counter unit 110 may be communicatively coupled to the first sensor 102 to detect the signal generated by the first sensor 102 in response to each of the first plurality of chain links 300 moving past the first sensor 102. Further, the first register 114 may be communicatively coupled to the first counter unit 110 to increment when each signal from the first sensor 102 is detected. Further, the second counter unit 112 may be communicatively coupled to the sensor 104 to detect a signal generated by the second sensor 104 in response to each of the second plurality of chain links moving pas the second sensor 104.

In some embodiments, the second register 116 may be communicatively coupled to the second counter unit to increment when each signal from the second sensor 104 is detected. In some embodiments, the first register 114 and the second register 116 is communicatively coupled to the at least one processor 106. Further, the first register 114 has a first overflow value and the second register 116 has a second overflow value that is equal to the first overflow value of the first register 114. In some other embodiments, the first overflow value may not be equal to the second overflow value. Further, the predefined target count for the first chain 202 may be different from a predefined target count for the second chain 204.

The at least one processor 106 may include suitable logic, circuitry, and/or interfaces that are operable to execute one or more instructions stored in the memory to perform predetermined operations. In one embodiment, the at least one processor 106 may be configured to decode and execute any instructions received from one or more other electronic devices or server(s). The at least one processor 106 may be configured to execute one or more computer-readable program instructions, such as program instructions to carry out any of the functions described in this description. Further, the at least one processor 106 may be implemented using the at least one processor 106 technologies known in the art. Examples of the at least one processor 106 include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

It will be apparent to one skilled in the art the above-mentioned components of the sensing system 100 have been provided only for illustration purposes, without departing from the scope of the disclosure.

FIG. 4 illustrates a perspective view of the first sensor 102, in accordance with an example embodiment of the present disclosure.

In some embodiments, the first sensor 102 may correspond to the optical fork sensor. The first sensor 102 may be a type of the photoelectric sensor that may operate using the plurality of light beams to detect the presence, or a movement of the first plurality of chain links 300. The first sensor 102 may be used in the conveyor 200 for detecting the first plurality of chain links 300 and counting the first plurality of chain links 300. In some embodiments, the first sensor 102 may comprise an emitter 400 and a receiver 402 that may be integrated into a housing 404. In some embodiments, the emitter 400 may comprise a light-emitting diode (LED) on one arm of the first sensor 102. The receiver 402 may comprise a photodiode or a phototransistor on opposite arm of the first sensor 102. The plurality of light beams may be emitted from the emitter 400 and may travel across a gap of the first sensor 102 to the receiver 402.

Further, if the first plurality of chain links 300 passes through the gap between the emitter 400 and the receiver 402, then one of the first plurality of chain links 300, or a portion thereof, may interrupt the plurality of light beams. The receiver 402 may detect the interruption and may send a signal to the at least one processor 106 indicating the presence of the first plurality of chain links 300. Once the first plurality of chain links 300 moves out of the detection region 302, the plurality of light beams may be restored. The restored plurality of light beams may interpret that one of the first plurality of chain links 300 may be passed. In some embodiments, the first sensor 102 may operate without physically touching the first plurality of chain links 300. The emitter 400 and the receiver 402 may be pre-aligned within the U-shaped housing. The first sensor 102 may correspond to a non-contact sensor. The first sensor 102 may have no moving parts and may be less prone to wear and tear.

In some embodiments, the first sensor 102 may further correspond to a fiber optic sensor, a laser sensor, a slot sensor, a beam break sensor, a through-beam photoelectric sensor, an ultrasonic sensor, or a hall effect sensor. In some embodiments, the fiber optic sensor may comprise a light emitter and a light receiver integrated within a protective housing. The emitter may comprise a light source, such as a laser or a LED, that may transmit light signal through a fiber optic cable. The receiver may detect changes in the light signal as the light signal may travel through the fiber optic cable. When an external factor, such as temperature or pressure, affects the fiber optic cable, the fiber optic cable may alter the light signal, which is then detected by the light receiver. The fiber optic sensor may operate without direct contact with the first sensor 102.

In some embodiments, the laser sensor may consist of a laser emitter and a photodetector integrated into a housing. The laser emitter may generate a focused beam of light directed towards the photodetector. When the first plurality of chain links 300 is present, the beam of light may be reflected back to the laser emitter, which may measure the time taken for the beam of light to return. The laser sensor may operate without making physical contact with the first plurality of chain links 300.

In some embodiments, the beam break sensor may comprise a light emitter and a light receiver housed in a compact unit. The light emitter may generate a continuous beam of light directed towards the light receiver. When the first plurality of chain links 300 interrupts the beam of light, the light receiver may detect the interruption and may send a signal indicating the presence of the first plurality of chain links 300. The beam break sensor may operate without requiring physical contact with the first plurality of chain links 300.

FIG. 5 illustrates a flowchart 500 showing a signal processing method for the first chain 202 and the second chain 204 wear detection, in accordance with an example embodiment of the present disclosure.

In some embodiments, the sensing system 100 may further comprise the first counter unit 110 communicatively coupled to the first sensor 102. The first counter unit 110 may be configured to detect the signal generated by the first sensor 102 in response to each of the first plurality of chain links 300 moving past the first sensor 102. Further, the sensing system 100 may comprise the first register 114 communicatively coupled to the first counter unit 110. The first register 114 may be configured to increment when each signal from the first sensor 102 is detected. Further, the first register 114 may be communicatively coupled to the at least one processor 106. The first register 114 may have the first overflow value.

In some embodiments, the first sensor 102 may detect the movement of the first plurality of chain links 300 and may generate a corresponding signal. The signal may be processed to count the number of the first plurality of chain links 300 and may determine the first elapsed time the first plurality of chain links 300 may take to pass through the first sensor 102. The first counter unit 110 may correspond to a positive edge counter or a negative edge counter.

In one embodiment, the positive edge counter may be configured to detect rising edges. The positive edge counter may be configured to indicate the first plurality of chain links 300 passing through the first sensor 102. Further, the first register 114 may increment each time the signal may transition from a low state (0) to a high state (1). The transition from the low state (0) to the high state (1) may indicate the presence of the first plurality of chain links 300 passing through a detection region 302 of the first sensor 102.

In another embodiment, the negative edge counter may be configured to detect falling edges. The negative edge counter may be configured to indicate when the first plurality of chain links 300 may have passed the first sensor 102. Further, the first register 114 may increment each time the signal may transition from a high state (1) to a low state (0). The transition from the high state (1) to the low state (0) may indicate the presence of the first plurality of chain links 300 may be passed through the detection region 302 of the first sensor 102. In some embodiments, the sensing system 100 may be configured to detect either the “rising edges” or the “falling edges”, depending on specific implementation and operating conditions.

In some embodiments, the sensing system 100 may comprise the second counter unit 112 communicatively coupled to the second sensor 104. The second counter unit 112 may be configured to detect the signal generated by the second sensor 104 in response to each of the second plurality of chain links moving past the second sensor 104. Further, the sensing system 100 may comprise the second register 116 communicatively coupled to the second counter unit 112. The second register 116 may be configured to increment when each signal from the second sensor 104 is detected. Further, the second register 116 may be communicatively coupled to the at least one processor 106. The second register 116 may have a second overflow value equal to the first overflow value of the first register 114.

In some embodiments, the second sensor 104 may detect the movement of the second plurality of chain links and may generate a corresponding signal. The signal may be processed to count the number of the second plurality of chain links and may determine the second elapsed time the second plurality of chain links may take to pass through the second sensor 104. The second counter unit 112 may correspond to the positive edge counter or the negative edge counter.

In one embodiment, the positive edge counter may be configured to detect the rising edges. The positive edge counter may be configured to indicate the second plurality of chain links may be passing through the second sensor 104. Further, the second register 116 may increment each time the signal may transition from a low state (0) to a high state (1). The transition from the low state (0) to the high state (1) may indicate the presence of the second plurality of chain links passing through a detection region of the second sensor 104.

In another embodiment, the negative edge counter may be configured to detect the falling edges. The negative edge counter may be configured to indicate when the second plurality of chain links may have passed the second sensor 104. Further, the second register 116 may increment each time the signal may transition from the high state (1) to the low state (0). The transition from the high state (1) to the low state (0) may indicate the presence of the second plurality of chain links may be passed through the detection region of the second sensor 104.

In some embodiments, the sensing system 100 further comprises a sync clock 502. The sync clock 502 may be communicatively coupled to a first sync timer 504 and a second sync timer 506. The first sync timer 504 and the second sync timer 506 may correspond to synchronized clocks that may measure timing of the signals generated by the first sensor 102 and the second sensor 104. The first sync timer 504 and the second sync timer 506 may help coordinate the signal detection process. The first sync timer 504 and the second sync timer 506 may further allow the at least one processor 106 to measure the time taken for the first plurality of chain links 300 and the first plurality of chain links 300 to pass through the first sensor 102 and the second sensor 104. The at least one processor 106 may further determine whether the chain elongation may be present by comparing the measured time against the predetermined threshold.

In some embodiments, the first register 114 and the second register 116 may be configured to temporarily store the counted data from the first counter unit 110, the second counter unit 112, the first sync timer 504 and the second sync timer 506. The first register 114 and the second register 116 may correspond to a buffer. The first register 114 and the second register 116 may hold the processed signals. The first register 114 and the second register 116 may correspond to shift registers. There may be four shift registers in the sensing system 100.

In some embodiments, the sensing system 100 further comprises an Electrically Erasable Programmable Read-Only Memory (EEPROM) 508. The EEPROM 508 may correspond to a non-volatile storage unit where the processed data from the first register 114 and the second register 116 may be stored. In some embodiments, the sensing system 100 further comprises the sync clock 502. The sync clock 502 may provide a timing reference for the sensing system 100. In some embodiments, the sensing system 100 further comprises an external interface. The external interface may allow for communication between the sensing system 100 and other external device. Data stored in the EEPROM 508 may be accessed via an external interface 510.

FIG. 6 illustrates a flowchart showing a method 600 for detecting wear in the first chain 202, in accordance with an example embodiment of the present disclosure. FIG. 7 illustrates a flowchart showing a method 700 for detecting wear in the second chain 204, in accordance with an example embodiment of the present disclosure.

At operation 602, the first sensor 102 may be configured to detect each of the first plurality of chain links 300 moving past the first sensor 102 as the first chain 202 moves to propel the conveyor 200. Further, at operation 604, the at least one processor 106 may be configured to determine the count of the first plurality of chain links 300 detected by the first sensor 102. Further, at operation 606, the at least one processor 106 may be configured to determine a first elapsed time for the count of the first plurality of chain links 300 to reach the predetermined target count. Further, at operation 608, the at least one processor 106 may be configured to determine whether the first elapsed time for the count of the first plurality of chain links 300 to reach the predetermined target count may exceed the first threshold time. Thereafter, at operation 610, the at least one processor 106 may be configured to generate the first alarm signal if the first elapsed time for the count of the first plurality of chain links 300 to reach the predetermined target count may exceed the first threshold time.

In some embodiment, at operation 702, the second sensor 104 is configured to detect each of the second plurality of chain links moving past the second sensor 104 as the second chain 204 moves to propel the conveyor 200. Further, at operation 704, the at least one processor 106 is configured to determine a count of the second plurality of chain links detected by the second sensor 104. Further at operation 706, the at least one processor 106 is configured to determine a second elapsed time for the count of the second plurality of chain links to reach the predetermined target count. Further, at operation 708, the at least one processor 106 is configured to determine whether the second elapsed time for the count of the second plurality of chain links to reach the predetermined target count may exceed the second threshold time. Thereafter, at operation 710, the at least one processor 106 is configured to generate the second alarm signal if the second elapsed time for the count of the second plurality of chain links to reach the predetermined target count may exceed the second threshold time.

The present disclosure offers several key advantages for conveyor chain monitoring and maintenance. The disclosed sensing system 100 provides several advantages for the conveyor chain monitoring and maintenance. By incorporating the first sensor 102 and the second sensor 104 to detect the first plurality of chain links 300 and the second plurality of chain links movement and using the at least one processor 106 to measure the elapsed time for the first plurality of chain links 300 and the second plurality of chain links to pass the first sensor 102 and the second sensor 104, the sensing system 100 allows for precise and real-time monitoring of the chain performance. The present disclosure ensures early detection of the chain elongation, the sag, or imbalance between the first chain 202 and the second chain 204, which can prevent severe wear, misalignment, or failure. The sensing system 100 also generates the alarm signals when the elapsed time exceeds the threshold time, enabling timely intervention to avoid equipment breakdowns, minimize downtime, and reduce maintenance costs. Further, the sensing system 100 enhances the conveyor 200 performance by ensuring balanced chain operation, promoting smoother and more efficient movement.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A sensing system for a conveyor having at least a first chain for propelling the conveyor, the first chain comprising a first plurality of chain links, the sensing system comprising:

a first sensor positioned to detect each of the first plurality of chain links moving past the first sensor as the first chain moves to propel the conveyor; and at least one processor configured to:

determine a count of the first plurality of chain links detected by the first sensor;

determine a first elapsed time for the count of the first plurality of chain links to reach a predetermined target count;

determine whether the first elapsed time for the count of the first plurality of chain links to reach the predetermined target count exceeds a first threshold time; and generate a first alarm signal if the first elapsed time for the count of the first plurality of chain links to reach the predetermined target count exceeds the first threshold time.

2. The sensing system of claim 1, wherein the conveyor has a second chain for propelling the conveyor, the second chain comprising a second plurality of chain links;

wherein the sensing system further comprises a second sensor positioned to detect each of the second plurality of chain links moving past the second sensor as the second chain moves to propel the conveyor;

wherein the at least one processor is further configured to:

determine a count of the second plurality of chain links detected by the second sensor;

determine a second elapsed time for the count of the second plurality of chain links to reach the predetermined target count;

determine whether the second elapsed time for the count of the second plurality of chain links to reach the predetermined target count exceeds a second threshold time; and generate a second alarm signal if the second elapsed time for the count of the second plurality of chain links to reach the predetermined target count exceeds the second threshold time.

3. The sensing system of claim 2, wherein the at least one processor is further configured to:

determine a difference between the first elapsed time and the second elapsed time;

determine if the difference between the first elapsed time and the second elapsed time exceeds a third threshold time; and generate a third alarm signal if the difference between the first elapsed time and the second elapsed time exceeds the third threshold time.

4. The sensing system of claim 3, further comprising:

a first counter unit communicatively coupled to the first sensor to detect a signal generated by the first sensor in response to each of the first plurality of chain links moving past the first sensor;

a first register communicatively coupled to the first counter unit to increment when each signal from the first sensor is detected;

a second counter unit communicatively coupled to the second sensor to detect a signal generated by the second sensor in response to each of the second plurality of chain links moving past the second sensor; and a second register communicatively coupled to second counter unit to increment when each signal from the second sensor is detected;

wherein the first register is communicatively coupled to the at least one processor;

wherein the second register is communicatively coupled to the at least one processor;

wherein the first register has a first overflow value;

wherein the second register has a second overflow value equal to the first overflow value of the first register; and wherein the predetermined target count equals the first overflow value of the first register.

5. The sensing system of claim 4, wherein the at least one processor determines the first elapsed time for the count of the first plurality of chain links to reach the predetermined target count when the at least one processor receives an overflow signal from the first register; and wherein the at least one processor determines the second elapsed time for the count of the second plurality of chain links to reach the predetermined target count when the at least one processor receives an overflow signal from the second register.

6. The sensing system of claim 3, further comprising an alarm unit communicatively coupled to the at least one processor.

7. The sensing system of claim 6, wherein the alarm unit is configured to trigger an alarm based at least on the generated first alarm signal, the generated second alarm signal, and/or the generated third alarm signal;

wherein the triggered alarm based on the first alarm signal indicates an elongation of the first chain;

wherein the triggered alarm based on the second alarm signal indicates an elongation of the second chain; and wherein the triggered alarm based on the third alarm signal indicates a delta exists between an elongation of the first chain and an elongation of the second chain.

8. The sensing system of claim 2, wherein the first threshold time corresponds to an elapsed time for the count of the first plurality of chain links to reach the predetermined target count during a calibration test of the sensing system; and wherein the second threshold time corresponds to an elapsed time for the count of the second plurality of chain links to reach the predetermined target count during the calibration test of the sensing system.

9. The sensing system of claim 2, wherein the first sensor and the second sensor correspond to an optical sensor.

10. The sensing system of claim 2, wherein the first plurality of chain links and the second plurality of chain links correspond to at least one of shoe sorter pins, shoe sorter rollers, connecting pins, attachment links, or guide links.

11. A method comprising:

detecting, via a first sensor, each of a first plurality of chain links moving past the first sensor as a first chain moves to propel a conveyor;

determining, via at least one processor, a count of the first plurality of chain links detected by the first sensor;

determining, via the at least one processor, a first elapsed time for the count of the first plurality of chain links to reach a predetermined target count;

determining, via the at least one processor, whether the first elapsed time for the count of the first plurality of chain links to reach the predetermined target count exceeds a first threshold time; and generating, via the at least one processor, a first alarm signal if the first elapsed time for the count of the first plurality of chain links to reach the predetermined target count exceeds the first threshold time.

12. The method of claim 11, further comprising:

detecting, via a second sensor, each of a second plurality of chain links moving past the second sensor as a second chain moves to propel the conveyor;

determining, via at least one processor, a count of the second plurality of chain links detected by the second sensor;

determining, via the at least one processor, a second elapsed time for the count of the second plurality of chain links to reach the predetermined target count;

determining, via the at least one processor, whether the second elapsed time for the count of the second plurality of chain links to reach the predetermined target count exceeds a second threshold time; and generating, via the at least one processor, a second alarm signal if the second elapsed time for the count of the second plurality of chain links to reach the predetermined target count exceeds the second threshold time.

13. The method of claim 12, further comprising:

determining, via the at least one processor, a difference between the first elapsed time and the second elapsed time;

determining, via the at least one processor, if the difference between the first elapsed time and the second elapsed time exceeds a third threshold time; and generating, via the at least one processor, a third alarm signal if the difference between the first elapsed time and the second elapsed time exceeds the third threshold time.

14. The method of claim 13, further comprising:

detecting, via a first counter unit communicatively coupled to the first sensor, a signal generated by the first sensor in response to each of the first plurality of chain links moving past the first sensor;

incrementing, via a first register communicatively coupled to the first counter unit, when each signal from the first sensor is detected;

detecting, via a second counter unit communicatively coupled to the second sensor, a signal generated by the second sensor in response to each of the second plurality of chain links moving past the second sensor; and incrementing, via a second register communicatively coupled to second counter unit, when each signal from the second sensor is detected;

wherein the first register is communicatively coupled to the at least one processor;

wherein the second register is communicatively coupled to the at least one processor;

wherein the first register has a first overflow value;

wherein the second register has a second overflow value equal to the first overflow value of the first register; and wherein the predetermined target count equals the first overflow value of the first register.

15. The method of claim 14, further comprising:

determining, via the at least one processor, the first elapsed time for the count of the first plurality of chain links to reach the predetermined target count when the at least one processor receives an overflow signal from the first register; and determining, via the at least one processor, the second elapsed time for the count of the second plurality of chain links to reach the predetermined target count when the at least one processor receives an overflow signal from the second register.

16. The method of claim 13, further comprising communicatively coupling an alarm unit to the at least one processor.

17. The method of claim 16, further comprising:

triggering, via the alarm unit, an alarm based at least on the generated first alarm signal, the generated second alarm signal, and/or the generated third alarm signal;

wherein the triggered alarm based on the first alarm signal indicates an elongation of the first chain;

wherein the triggered alarm based on the second alarm signal indicates an elongation of the second chain; and wherein the triggered alarm based on the third alarm signal indicates a delta exists between an elongation of the first chain and an elongation of the second chain.

18. The method of claim 12, wherein the first threshold time corresponds to an elapsed time for the count of the first plurality of chain links to reach the predetermined target count during a calibration test of a sensing system; and wherein the second threshold time corresponds to an elapsed time for the count of the second plurality of chain links to reach the predetermined target count during the calibration test of the sensing system.

19. The method of claim 12, wherein the first sensor and the second sensor correspond to an optical sensor.

20. The method of claim 12, wherein the first plurality of chain links and the second plurality of chain links correspond to at least one of shoe sorter pins, shoe sorter rollers, connecting pins, attachment links, or guide links.

* * * * *